United States Patent
Laney et al.

(10) Patent No.: US 6,703,193 B1
(45) Date of Patent: Mar. 9, 2004

(54) MICROBEAD AND IMMISCIBLE POLYMER VOIDED POLYESTER FOR IMAGING MEDIAS

(75) Inventors: Thomas M. Laney, Spencerport, NY (US); Kenneth W. Best, Jr., Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/326,451

(22) Filed: Dec. 20, 2002

(51) Int. Cl.[7] .................. G03C 1/765; G03C 1/795; B32B 3/26; B32B 9/00; B32B 27/00
(52) U.S. Cl. .................. 430/496; 430/533; 428/315.5; 428/316.6; 428/318.4; 428/319.3
(58) Field of Search ................. 430/533, 496; 428/315.5, 316.6, 318.4, 319.3

(56) References Cited

U.S. PATENT DOCUMENTS

| 4,187,113 A | | 2/1980 | Mathews et al. | |
|---|---|---|---|---|
| 4,994,312 A | * | 2/1991 | Maier et al. | 428/315.5 |
| 6,093,521 A | | 7/2000 | Laney et al. | |
| 6,355,404 B1 | | 3/2002 | Camp et al. | |

FOREIGN PATENT DOCUMENTS

WO     WO 96/12766    * 5/1996

* cited by examiner

*Primary Examiner*—Richard L. Schilling
(74) *Attorney, Agent, or Firm*—Lynne M. Blank

(57) ABSTRACT

The present invention relates to an image recording element a microvoided layer comprising a continuous phase polyester matrix having dispersed therein crosslinked organic microbeads and non-crosslinked polymer particles, wherein the non-crosslinked polymer particles are immiscible with the polyester matrix of the microvoided layer.

25 Claims, No Drawings

MICROBEAD AND IMMISCIBLE POLYMER VOIDED POLYESTER FOR IMAGING MEDIAS

CROSS REFERENCE TO RELATED APPLICATIONS

Reference is made to commonly assigned, co-pending U.S. Patent applications:

Ser. No. 10/326,448 by Thomas M. Laney and Teh-Ming Kung filed of even date herewith entitled "MICROBEAD AND IMMICIBLE POLYMER VOIDED POLYESTER FOR INKJET IMAGING MEDIAS"; and Ser. No. 10/324,490 by Thomas M. Laney and Teh-Ming Kung filed of even date herewith entitled "MICROBEAD AND IMMICIBLE POLYMER VOIDED POLYESTER FOR THERMAL IMAGING MEDIAS",the disclosures of which are incorporated herein.

FIELD OF THE INVENTION

The present invention relates to microbead and immiscible polymer voided films for use in imaging media.

BACKGROUND OF THE INVENTION

Recording elements or media typically comprise a substrate or a support material optionally having on at least one surface thereof an image-forming layer. The elements include those intended for reflection viewing, which usually have an opaque support, and those intended for viewing by transmitted light, which usually have a transparent support.

While a wide variety of different types of image-recording elements have been proposed, there are many unsolved problems in the art and many deficiencies in the known products which have severely limited their commercial usefulness. These deficiencies vary with the type of image recording element.

Various arrangements have been proposed to improve the quality of silver halide imaging medias as well. In the case of display medias it has been described in U.S. Pat. Nos. 6,093,521 and 6,355,404 how voided polyester layers in the substrate of a display designed to have high image quality when viewed either in reflection or transmission modes are very effective. The preferred means by which to void the polyester in the voided layer of the displays described in U.S. Pat. Nos. 6,093,521 and 6,355,404 is to use crosslinked microbeads as void initiators. Although these microbeads perform very well in terms of light diffusion and image quality, they require a complex process to manufacture. Also, a pre-mixing step, known as compounding, is used to introduce the microbeads into the polyester prior to manufacturing the substrate. This results in a high cost to manufacture display medias using substrates comprising only microbeads as the void initiators in the voided polyester layer.

The use of immiscible polymer particles as a void initiator has been described in U.S. Pat. No. 4,187,113. This means of voiding is very robust and results in a low cost means to void polyester. The immiscible polymer may be added simultaneously with manufacturing the substrate. However, the use of such a voided polyester layer in the display medias of U.S. Pat. Nos. 6,093,521 and 6,355,404 results in very poor image sharpness due to the relatively large voids which result when voiding with immiscible polymers in this manner. Thus, it can be seen that a need still exists in the art for the provision of a silver halide image recording element for displays with both high image quality and low manufacturing cost.

The problem to be solved by the present invention is to formulate a silver halide display imaging media with a voided polyester diffuse layer which provides both high image quality and low manufacturing cost.

SUMMARY OF THE INVENTION

The present invention relates to an image recording element comprising an image recording element comprising a microvoided layer comprising a continuous phase polyester matrix having dispersed therein crosslinked organic microbeads and non-crosslinked polymer particles that are immiscible with the polyester matrix of the microvoided layer.

ADVANTAGEOUS EFFECT OF THE INVENTION

The present invention includes several advantages, not all of which may be incorporated in any one embodiment. In one advantage, the invention provides improved imaging medias. In another advantage, the invention provides improved image sharpness and lower manufacturing and raw material cost compared to prior art voided polyester substrate silver halide imaging medias.

DETAILED DESCRIPTION OF THE INVENTION

The invention relates to image recording elements comprising a voided layer of polyester matrix. The recording element may additionally comprise an image recording layer. The voided polyester layer of the element comprises a continuous phase polyester matrix having dispersed therein crosslinked organic microbeads and non-crosslinked polymer particles. The non-crosslinked polymer particles are immiscible with the polyester matrix to form a microvoided layer that can be produced at a much lower manufacturing cost than that using crosslinked microbeads.

In the prior art, microvoided polyester matrix layers have been formed by using either microbeads or non-crosslinked polymer particles that are immiscible with the polyester matrix. In the case of silver halide display medias when only microbeads are used, very high image sharpness is attained. However, there is a disadvantage of high manufacturing cost, since the beads require a complex process to manufacture and are therefore expensive and are used at high usage levels. In addition, a pre-mixing step, known as compounding, is used to introduce the microbeads into the polyester matrix prior to manufacturing the substrate. This results in a high cost to manufacture display medias using substrates comprising only microbeads as the void initiators in the voided polyester layer, since the high usage levels adds time and effort to the manufacturing process. Thus, although microbeads produce an element with good quality with respect to sharpness, they are very expensive for use in imaging media due to their high raw material cost, and time and effort consuming when used in the imaging media manufacturing process If only non-crosslinked polymer particles that are immiscible with the polyester matrix are used in the microvoided layer of a silver halide display media the raw material and manufacturing cost is low, as a compounding step is not required, but the image sharpness is very poor due to the relatively large voids that result. Thus although the use of immiscible polymer particles as voiding agents in imaging media is attractive from a cost standpoint, the quality with respect to sharpness is prohibitively inferior.

It has been unexpectedly discovered that by mixing both the crosslinked organic microbeads and the non-crosslinked polymer particles that are immiscible with polyester into the polyester matrix of the microvoided layer the deficiencies of the void initiators when used singularly are synergistically overcome, especially with respect to image quality and manufacturability. The combination of crosslinked organic beads and non-crosslinked polymer particles immiscible in a polyester matrix enjoys the quality, with respect to sharpness of microbead-voided media, without the expected degradation associated with the addition of a material with poor sharpness quality, with significant cost reductions and manufacturing time and effort reductions resulting from the need to use less costly raw material which in turn lowers the time and effort needed to compound microbeads with matrix polymer.

The terms as used herein, "top", "upper", and "face" mean the side or toward the side of the element receiving an image. The terms "bottom", "lower side", and "back" mean the side opposite that which receives an image.

The term as used herein, "transparent" means the ability to pass radiation without significant deviation or absorption. For this invention, "transparent" material is defined as a material that has a spectral transmission greater than 20%. For a photographic element, spectral transmission is the ratio of the transmitted power to the incident power and is expressed as a percentage as follows; $T_{RGB}=10^{D}*100$ where D is the average of the red, green and blue Status A transmission density response measured by an X-Rite model 310 (or comparable) photographic transmission densitometer. The term as used herein, "duplitized" element means elements with light sensitive silver halide coating on the top side and the bottom side of the imaging support.

The term voids or microvoids means pores formed in an oriented polymeric film during stretching as the result of a void-initiating particle. In the present invention, these pores are initiated by either microcrosslinked organic microbeads or non-crosslinked polymer particles that are immiscible with the polyester matrix. The term microbead means synthesized polymeric spheres which, in the present invention, are crosslinked.

The continuous phase polyester matrix of the microvoided layer comprises any polyester and preferably comprises polyethylene(terephthalate) or a copolymer thereof. Suitable polyesters include those produced from aromatic, aliphatic, or cyclo-aliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fiimaric, maleic, itaconic, 1,4-cyclohexane-dicarboxylic, sodiosulfoisophthalic, and mixtures thereof. Examples of suitable glycols include ethylene glycol, propylene glycol, butanediol, pentanediol, hexanediol, 1,4-cyclohexane-dimethanol, diethylene glycol, other polyethylene glycols and mixtures thereof. Such polyesters are well known in the art and may be produced by well-known techniques, for example, those described in U.S. Pat. Nos. 2,465,319 and 2,901,466. Preferred continuous matrix polymers are those having repeat units from terephthalic acid or naphthalene dicarboxylic acid and at least one glycol selected from ethylene glycol, 1,4-butanediol, and 1,4-cyclohexanedimethanol. Poly(ethylene terephthalate), which may be modified by small amounts of other monomers, is especially preferred. Other suitable polyesters include liquid crystal copolyesters formed by the inclusion of a suitable amount of a co-acid component such as stilbene dicarboxylic acid. Examples of such liquid crystal copolyesters are those disclosed in U.S. Pat. Nos. 4,420,607; 4,459,402; and 4,468,510.

The polyester utilized in a matrix with the invention should have a glass transition temperature from 50 degrees C. to 150 degrees C., preferably from 60 to 100 degrees C., should be orientable, and have an intrinsic viscosity of at least 0.50 centipoise (cps), preferably from 0.55 to 0.9 cps. Examples include a blend comprising polyethylene (terephthalate) and poly(1,4-cyclohexylene dimethylene terephthalate.

The image recording element of the present invention comprises crosslinked organic microbeads. These crosslinked organic microbead spheres may range in size from 0.2 to 30 micrometers. They are preferably in the range of from 0.5 to 5.0 μm. Crosslinked organic microbeads comprising a polystyrene, polyacrylate, polyallylic, or poly (methacrylate) polymer are preferred.

Preferred polymers for use in the crosslinked organic microbeads may be crosslinked and may be selected from the group consisting of alkenyl aromatic compounds having the general formula:

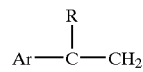

wherein Ar represents an aromatic hydrocarbon moiety, or an aromatic halohydrocarbon moiety of the benzene series and R may be hydrogen or methyl moiety; acrylate-type monomers including monomers of the formula:

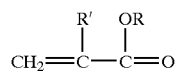

wherein R may be selected from the group consisting of hydrogen and an alkyl moiety containing from 1 to 12 carbon atoms and R' may be selected from the group consisting of hydrogen and methyl; copolymers of vinyl chloride and vinylidene chloride, acrylonitrile and vinyl chloride, vinyl bromide, vinyl esters having the formula:

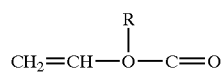

wherein R may be an alkyl group containing from 2 to 18 carbon atoms; acrylic acid, methacrylic acid, itaconic acid, citraconic acid, maleic acid, fumaric acid, oleic acid, vinylbenzoic acid; the synthetic polyester resins which may be prepared by reacting terephthalic acid and dialkyl terephthalics or ester-forming derivatives thereof, with a glycol of the series $HO(CH_2)_nOH$, wherein n may be a whole number within the range of 2–10 and having reactive olefinic linkages within the polymer molecule, the hereinabove described polyesters which include copolymerized therein up to 20 percent by weight of a second acid or ester thereof having reactive olefinic unsaturation and mixtures thereof, and a cross-linking agent selected from the group consisting of divinyl-benzene, diethylene glycol dimethacrylate, oiallyl fumarate, diallyl phthalate, and mixtures thereof.

Examples of typical monomers for making the crosslinked crosslinked organic microbeads include styrene, butyl acrylate, acrylamide, acrylonitrile, methyl methacrylate, ethylene glycol dimethacrylate, vinyl pyridine, vinyl acetate, methyl acrylate, vinylbenzyl chloride, vinylidene chloride, acrylic acid, divinylbenzene, arylamidomethyl-propane sulfonic acid, vinyl toluene, trimethylol propane triacrylate. Preferably, the crosslinked polymer may be poly(butyl acrylate) or poly(methyl methacrylate). Most preferably, it is a mixture of the two, and the cross-linking agent is trimethylol propane triacrylate.

In the present invention, for the polymer to have suitable physical properties such as resiliency, the polymer may be crosslinked. In the case of styrene crosslinked with divinylbenzene, the polymer may be from 2.5 to 50% crosslinked, and preferably from 20 to 40% crosslinked. Percent crosslinked means the mol % of cross-linking agent based on the amount of primary monomer. Such limited cross-linking produces organic microbeads which are sufficiently coherent to remain intact during orientation of the continuous polymer. Organic microbeads of such cross-linking may also be resilient, so that when they are deformed or flattened during orientation by pressure from the matrix polymer on opposite sides of the crosslinked organic microbeads, they subsequently resume their normal spherical shape to produce the largest possible voids around the crosslinked organic microbeads, thereby producing articles with less density.

The crosslinked organic microbeads may have a coating of a "slip agent". "Slip" means that the friction at the surface of the crosslinked organic microbeads is greatly reduced. Actually, it is believed this may be caused by the silica acting as miniature ball bearings at the surface. Slip agent may be formed on the surface of the crosslinked organic microbeads during their formation by including it in the suspension polymerization mix. Suitable slip agents or lubricants include colloidal silica, colloidal alumina, and metal oxides such as tin oxide and aluminum oxide. The preferred slip agents are colloidal silica and alumina, most preferably, silica. The crosslinked polymer having a coating of slip agent may be prepared by procedures well known in the art. For example, conventional suspension polymerization processes, wherein the slip agent is added to the suspension, are preferred.

The crosslinked organic microbeads coated with slip agent may be prepared by various methods. The crosslinked organic microbeads may be prepared, for example, by a procedure in which monomer droplets containing an initiator may be sized and heated to give solid polymer spheres of the same size as the monomer droplets. In a preferred method, the polymer may be polystyrene crosslinked with divinylbenzene. The crosslinked organic microbeads may have a coating of silica. The concentration of divinylbenzene may be adjusted up or down to result in from 2.5 to 50% cross-linking by the active cross-linker, and, preferably, from 10 to 40% cross-linking by the active cross-linker. Of course, monomers other than styrene and divinylbenzene may be used in similar suspension polymerization processes known in the art. Also, other initiators and promoters may be used as known in the art. Slip agents other than silica may also be used. For example, a number of LUDOX® colloidal silicas are available from DuPont. LEPANDIN® colloidal alumina is available from Degussa. NALCOAG® colloidal silicas are available from Nalco, and tin oxide and titanium oxide are also available from Nalco.

Crosslinked organic microbead size may be regulated by the ratio of silica to monomer. For example, the following ratios produce the indicated size crosslinked organic microbead:

| Crosslinked Organic Microbead Size, µm | Monomer, Parts by Wt. | Slip Agent (Silica) Parts by Wt. |
|---|---|---|
| 2 | 10.4 | 1 |
| 5 | 27.0 | 1 |
| 20 | 42.4 | 1 |

The crosslinked organic microbeads should be dispersed into the polyester matrix prior to extruding a pre-stretched film. This may be typically accomplished using a melt compounding process utilizing a twin screw extruder.

Processes well known in the art yield crosslinked organic microbeads suitable for use in the present invention. The processes known for making non-uniformly sized crosslinked organic microbeads may be characterized by broad particle size distributions and the resulting microbeads may be classified by screening to produce beads spanning the range of the original distribution of sizes. Other processes such as suspension polymerization and limited coalescence directly yield very uniformly sized crosslinked organic microbeads. Preferably, the crosslinked organic microbeads are synthesized using the limited coalescence process. This process is described in detail in U.S. Pat. No. 3,615,972. Preparation of the coated crosslinked organic microbeads for use in the present invention does not utilize a blowing agent as described in U.S. Pat. No. 3,615,972.

"Limited coalescence" is a phenomenon wherein droplets of liquid dispersed in certain aqueous suspending media coalesce, with formation of a lesser number of larger droplets, until the growing droplets reach a certain critical and limiting size, whereupon coalescence substantially ceases. The resulting droplets of dispersed liquid, which may be as large as 0.3 and sometimes 0.5 centimeter in diameter, are quite stable, as regards further coalescence and are remarkably uniform in size. If such a large droplet dispersion is vigorously agitated, the droplets may be fragmented into smaller droplets. The fragmented droplets, upon quiescent standing, again coalesce to the same limited degree and form the same uniform-sized, large droplet, stable dispersion. Thus, a dispersion resulting from the limited coalescence comprises droplets of substantially uniform diameter that are stable in respect to further coalescence.

The principles underlying the limited coalescence phenomenon have now been adapted to cause the occurrence of limited coalescence in a deliberate and predictable manner in the preparation of dispersions of polymerizable liquids in the form of droplets of uniform and desired size.

In the phenomenon of limited coalescence, the small particles of solid colloid tend to collect with the aqueous liquid at the liquid-liquid interface, that is, on the surface of the oil droplets. It is thought that droplets which are substantially covered by such solid colloid may be stable to coalescence while droplets which are not so covered may not be stable. In a given dispersion of a polymerizable liquid, the total surface area of the droplets is a function of the total volume of the liquid and the diameter of the droplets. Similarly, the total surface area barely coverable by the solid colloid, for example, in a layer one particle thick, is a function of the amount of the colloid and the dimensions of the particles thereof. In the dispersion as initially prepared, for example, by agitation, the total surface area of the polymerizable liquid droplets may be greater than may be covered by the solid colloid. Under quiescent conditions, the unstable droplets begin to coalesce. The coalescence results in a decrease in the number of oil droplets and a decrease in the total surface area thereof up to a point at which the amount of colloidal solid may be barely sufficient to cover the total surface of the oil droplets, whereupon coalescence substantially ceases.

If the solid colloidal particles do not have nearly identical dimensions, the average effective dimension may be estimated by statistical methods. For example, the average effective diameter of spherical particles may be computed as the square root of the average of the squares of the actual diameters of the particles in a representative sample.

It may be beneficial to treat the uniform droplet suspension prepared as described above to render the suspension stable against congregation of the oil droplets. This further stabilization may be accomplished by gently admixing an agent capable of greatly increasing the viscosity of the aqueous liquid with the uniform droplet dispersion. For this purpose, any water-soluble or water-dispersible thickening agent may be used that is insoluble in the oil droplets and that does not remove the layer of solid colloidal particles covering the surface of the oil droplets at the oil-water interface. Examples of suitable thickening agents may be sulfonated polystyrene, for example, water-dispersible, thickening grade, hydrophilic clays such as Bentonite, digested starch, natural gums, and carboxy-substituted cellulose ethers. The thickening agent may be selected and employed in such quantities as to form a thixotropic gel in which the uniform-sized droplets of the oil may be suspended. In other words, the thickened liquid generally should be non-Newtonian in its fluid behavior, that is, of a nature to prevent rapid movement of the dispersed droplets within the aqueous liquid by the action of gravitational force due to the difference in density of the phases. The stress exerted on the surrounding medium by a suspended droplet may not be sufficient to cause rapid movement of the droplet within such non-Newtonian media. Usually, the thickener agents may be employed in such proportions relative to the aqueous liquid that the apparent viscosity of the thickened aqueous liquid is in the order of at least 500 centipoise as determined by means of a Brookfield viscometer using the No. 2 spindle at 30 rpm. The thickening agent is preferably prepared as a separate concentrated aqueous composition that is then carefully blended with the oil droplet dispersion. The resulting thickened dispersion is capable of being handled, for example, passed through pipes, and may be subjected to polymerization conditions substantially without mechanical change in the size or shape of the dispersed oil droplets.

The resulting dispersions may be particularly well suited for use in continuous polymerization procedures that may be carried out in coils, tubes, and elongated vessels adapted for continuously introducing the thickened dispersions into one end and for continuously withdrawing the mass of polymer beads from the other end. The polymerization step may also be practiced in batch manner.

The order of the addition of the constituents to the polymerization usually is not critical, but it may be more convenient to add the water, dispersing agent, and incorporated oil-soluble catalyst to the monomer mixture to a vessel and subsequently add the monomer phase to the water phase with agitation.

The following general procedure may be utilized in a limited coalescence technique:

1. The polymerizable liquid is dispersed within an aqueous nonsolvent liquid medium to form a dispersion of droplets having sizes not larger than the size desired for the polymer globules, whereupon
2. The dispersion is allowed to rest and to reside with only mild or no agitation for a time during which a limited coalescence of the dispersed droplets takes place with the formation of a lesser number of larger droplets, such coalescence being limited due to the composition of the suspending medium, the size of the dispersed droplets thereby becoming remarkably uniform and of a desired magnitude, and
3. The uniform droplet dispersion is then stabilized by addition of thickening agents to the aqueous suspending medium, whereby the uniform-sized dispersed droplets are further protected against coalescence and are also retarded from concentrating in the dispersion due to difference in density of the disperse phase and continuous phase, and
4. The polymerizable liquid or oil phase in such stabilized dispersion is subjected to polymerization conditions and polymerized, whereby globules of polymer are obtained having spheroidal shape and remarkably uniform and desired size, which size is predetermined principally by the composition of the initial aqueous liquid suspending medium.

The diameter of the droplets of polymerizable liquid and, hence, the diameter of the beads of polymer, may be varied predictably, by deliberate variation of the composition of the aqueous liquid dispersion, within the range of from 0.5 $\mu$m or less to 0.5 centimeter. For any specific operation, the range of diameters of the droplets of liquid and, hence, of polymer beads, has a factor in the order of three or less as contrasted to factors of 10 or more for diameters of droplets and beads prepared by usual suspension polymerization methods employing critical agitation procedures. Since the bead size, for example, diameter, in the present method is determined principally by the composition of the aqueous dispersion, the mechanical conditions, such as the degree of agitation, the size and design of the apparatus used, and the scale of operation are not highly critical. Furthermore, by employing the same composition, the operations may be repeated, or the scale of operations may be changed, and substantially the same results may be obtained.

One bead formation method may be carried out by dispersing one part by volume of a polymerizable liquid into at least 0.5, preferably from 0.5 to 10 or more parts by volume of a nonsolvent aqueous medium comprising water and at least the first of the following ingredients:

1. A water-dispersible, water-insoluble solid colloid, the particles of which, in aqueous dispersion, have dimensions in the order of from 0.008 to 50 $\mu$m, which particles tend to gather at the liquid-liquid interface or are caused to do so by the presence of
2. A water-soluble "promotor" that affects the "hydrophilic-hydrophobic balance" of the solid colloid particles; and/or
3. An electrolyte; and/or
4. Colloid-active modifiers such as peptizing agents, and surface-active agents; and usually,
5. A water-soluble, monomer-insoluble inhibitor of polymerization.

The water-dispersible, water-insoluble solid colloids may be inorganic materials, such as metal salts, hydroxides or clays, or may be organic materials, such as raw starches, sulfonated crosslinked organic high polymers, and resinous polymers.

The solid colloidal material should be insoluble but dispersible in water and both insoluble and nondispersible in, but wettable by, the polymerizable liquid. The solid colloids should be much more hydrophilic than oleophilic to remain dispersed wholly within the aqueous liquid. The solid colloids employed for limited coalescence are ones having particles that, in the aqueous liquid, retain a relatively rigid and discrete shape and size within the limits stated. The particles may be greatly swollen and extensively hydrated, provided that the swollen particle retains a definite shape, in which case the effective size may be approximately that of the swollen particle. The particles may be single molecules, as in the case of extremely high molecular weight crosslinked resins, or may be aggregates of many molecules. Materials that disperse in water to form true or colloidal solutions in which the particles have a size below the range stated or in which the particles may be so diffuse as to lack a discernible shape and dimension may be not suitable as stabilizers for limited coalescence. The amount of solid colloid that may be employed usually corresponds to from 0.01 to 10 or more grams per 100 cubic centimeters of the polymerizable liquid.

In order to function as a stabilizer for the limited coalescence of the polymerizable liquid droplets, it may be essential that the solid colloid should tend to collect with the aqueous liquid at the liquid-liquid interface, that is, on the surface of the oil droplets. The term "oil" may be occasionally used herein as generic to liquids that are insoluble in water. In many instances, it may be desirable to add a "promoter" material to the aqueous composition to drive the particles of the solid colloid to the liquid-liquid interface. This phenomenon is well known in the emulsion art, and is here applied to solid colloidal particles, as an expanded means of adjusting the "hydrophilic-hydrophobic balance."

Usually, the promoters are organic materials that have an affinity for the solid colloid and also for the oil droplets and that may be capable of making the solid colloid more oleophilic. The affinity for the oil surface may be due to some organic portion of the promoter molecule, while affinity for the solid colloid may be due to opposite electrical charges. For example, positively charged complex metal salts or hydroxides, such as aluminum hydroxide, may be promoted by the presence of negatively charged organic promoters such as water-soluble sulfonated polystyrenes, alignates, and carboxymethylcellulose. Negatively charged colloids, such as Bentonite, may be promoted by positively charged promoters such as tetramethyl ammonium hydroxide or chloride or water-soluble complex resinous amine condensation products, such as the water-soluble condensation products of diethanolamine and adipic acid, the water-soluble condensation products of ethylene oxide, urea and formaldehyde, and polyethylenimine. Amphoteric materials, such as proteinaceous materials like gelatin, glue, casein, albumin, or glutin, may be effective promoters for a wide variety of colloidal solids. Nonionic materials like methoxycellulose may also be effective in some instances. Usually, the promoter should be used only to the extent of a few parts per million of aqueous medium, although larger proportions may often be tolerated. In some instances, ionic materials normally classed as emulsifiers, such as soaps, long chain sulfates and sulfonates and the long chain quaternary ammonium compounds, may also be used as promoters for the solid colloids, but care should be taken to avoid causing the formation of stable colloidal emulsions of the polymerizable liquid and the aqueous liquid medium.

An effect similar to that of organic promoters may be obtained with small amounts of electrolytes, for example, water-soluble, ionizable alkalies, acids and salts, particularly those having polyvalent ions. These may be useful when the excessive hydrophilic or insufficient oleophilic characteristic of the colloid is attributable to excessive hydration of the colloid structure. For example, a suitably crosslinked sulfonated polymer of styrene may be swollen and hydrated in water. Although the molecular structure contains benzene rings which should confer on the colloid some affinity for the oil phase in the dispersion, the degree of hydration causes the colloidal particles to be enveloped in a cloud of associated water. The addition of a soluble, ionizable polyvalent cationic compound, such as an aluminum or calcium salt, to the aqueous composition may cause extensive shrinking of the swollen colloid with exudation of a part of the associated water and exposure of the organic portion of the colloid particle, thereby making the colloid more oleophilic.

The solid colloidal particles whose hydrophilic-hydrophobic balance may be such that the particles tend to gather in the aqueous phase at the oil-water interface, gather on the surface of the oil droplets, and function as protective agents during limited coalescence.

Other agents that may be employed in an already known manner to effect modification of the colloidal properties of the aqueous composition are those materials known in the art as peptizing agents, flocculating and deflocculating agents, sensitizers, and surface active agents.

It is sometimes desirable to add a few parts per million of a water-soluble, oil-insoluble inhibitor of polymerization to the aqueous liquid to prevent the polymerization of monomer molecules that might diffuse into the aqueous liquid or that might be absorbed by colloid micelles and that, if allowed to polymerize in the aqueous phase, would tend to make emulsion-type polymer dispersions instead of, or in addition to, the desired bead or pearl polymers.

The aqueous medium containing the water-dispersible solid colloid may then be admixed with the liquid polymerizable material in such a way as to disperse the liquid polymerizable material as small droplets within the aqueous medium. This dispersion may be accomplished by any usual means, for example, by mechanical stirrers or shakers, by pumping through jets, by impingement, or by other procedures causing subdivision of the polymerizable material into droplets in a continuous aqueous medium.

The degree of dispersion, for example, by agitation, is not critical, although the size of the dispersed liquid droplets should be no larger, and may be preferably much smaller, than the stable droplet size expected and desired in the stable dispersion. When such condition has been attained, the resulting dispersion may be allowed to rest with only mild, gentle movement, if any, and preferably without agitation. Under such quiescent conditions, the dispersed liquid phase undergoes a limited degree of coalescence.

The non-crosslinked polymer particles in the voided layer should be immiscible with the polyester matrix. Typical non-crosslinked polymer particles that are immiscible with the polyester matrix are olefins. The preferred olefin non-crosslinked polymer particles, which may be blended with the polyester matrix, are a homopolymers or copolymers of polypropylene or polyethylene. Polypropylene is preferred.

The preferred polyolefin non-crosslinked polymer particles additive used according to this invention is immiscible with the polyester matrix component of the film and exists in the form of discrete non-crosslinked polymer particles dispersed throughout the oriented and heat set film. Voiding occurs between the non-crosslinked polymer particles that are immiscible with the polyester matrix and the polyester matrix, when the film is stretched. It has been discovered that the non-crosslinked polymer particles additive should be blended with the linear polyester matrix prior to extrusion through the film forming die by a process which results in a loosely blended mixture and does not develop an intimate bond between the polyester matrix and the preferred polyolefin non-crosslinked polymer particles additive.

Such a blending operation preserves the incompatibility of the components and leads to voiding when the film is stretched. A process of dry blending the polyester of the matrix and preferred polyolefin non-crosslinked polymer particles additive has been found to be useful. For instance, blending may be accomplished by mixing finely divided, for example powdered or granular, polyester and non-crosslinked polymer particles additive and, thoroughly mixing them together, for example by tumbling them.

In order to form the microvoided layer of this invention, crosslinked organic microbeads should first be dispersed into a polyester matrix prior to the film forming process. This may be accomplished by feeding both the polyester, in either pellet or powder form, and the crosslinked organic microbeads into a twin screw extruder. The polyester may be melted and the crosslinked organic microbeads may be dispersed into the polyester melt in the twin screw extruder. The resulting extrudate may be then quenched in a water bath and then pelletized into pellets to be used in the film forming process. These pellets may be then dry blended with the polyolefin of choice, typically a polypropylene. The polyolefin may be typically in pellet form as well. Pellets of polyester may also be added to the dry blend if modifications to the volumetric loading of the crosslinked organic microbeads and the immiscible polymer are desired. The ratio of the volume of crosslinked organic microbeads used relative to the volume of the immiscible polymer used in the final blend may range from 2:3 to 3:2. The preferred ratio is 1:1.

The resulting mixture may be then fed to the film forming extruder. The extrusion, quenching and stretching of the film may be effected by any process which is known in the art for producing oriented polyester film, for example by a flat film process or a bubble or tubular process. The flat film process is preferred for making film for use with this invention and involves extruding the blend through a slit die and rapidly quenching the extruded web upon a chilled casting drum so that the polyester matrix component of the film may be quenched into the amorphous state. The quenched film may be then biaxially oriented by stretching in mutually perpendicular directions at a temperature above the glass-rubber transition temperature of the polyester matrix. Generally the film is stretched in one direction first and then in the second direction although stretching may be effected in both directions simultaneously if desired. In a typical process, the film is stretched firstly in the direction of extrusion over a set of rotating rollers or between two pairs of nip rollers and is then stretched in the direction transverse thereto by means of a tenter apparatus. The film may be stretched in each direction to 2.5 to 4.5 times its original dimension in the direction of stretching. The ratio of the stretching in each direction is preferably such as to form voids in the sheet with a width to length ratio of from 1:1 to 2:1. After the film has been stretched it may be heat set by heating to a temperature sufficient to crystallize the polyester matrix while restraining the film against retraction in both directions of stretching. When non-crosslinked immiscible polymer voiding agent is used in the voided layer, the voiding tends to collapse as the heat setting temperature is increased and the degree of collapse increases as the temperature increases. Hence the void volume decreases with an increase in heat setting temperatures. While heat setting temperatures up to 230° C. may be used without destroying the voids when only crosslinked organic microbeads are used in the voided layer, temperatures below 155° C. may result in a greater degree of voiding when non-crosslinked immiscible polymer voiding agent is used.

Blended polyester matrix, crosslinked organic microbeads, and non-crosslinked polymer particles which have been extruded and, for example, reduced to a granulated or flaked form, may be successfully re-extruded into a voided film. It may be thus possible to re-feed scrap film, for example as edge trimmings, through the process.

The size of the microvoids formed is determined by the size of the crosslinked organic microbead or non-crosslinked polymer particle used to initiate the void and by the stretch ratio used to stretch the oriented polymeric film. The pores may range from 0.6 to 150 $\mu$m in machine and cross machine directions of the film. They typically range from 0.2 to 30 $\mu$m in height. Preferably the height of the pores is in the range of 0.5 to 15.0 $\mu$m.

A void volume of from 25% to 55% is preferred for imaging elements not requiring absorbency as for thermal dye transfer medias and silver halide displays. The density of the microvoided layer should be less than 0.95 grams/cc. The preferred range is 0.40 to 0.90 grams/cc.

The voided layer described above, by itself, might constitute an image recording element of this invention. In another embodiment, adjacent clear polyester layer or layers could be included to add structural integrity of the display media base. The voided layer and clear polyester layer or layers could also have image recording layers adjacent to one or more outer surfaces which together comprise the image recording element. The total thickness of the base, which is the thickness of the imaging element without the imaging layers, may range from 100 to 400 ($\mu$m). Most applications require the base thickness to be within the range of from 150 to 300 ($\mu$m). The preferred range is from 170 to 200 ($\mu$m).

The image recording layers described above may be coated by conventional coating means commonly used in this art. Coating methods may include, but are not limited to, wound wire rod coating, knife coating, slot coating, slide hopper coating, gravure coating, spin coating, dip coating, skim-pan-air-knife coating, multilayer slide bead, doctor blade coating, gravure coating, reverse-roll coating, curtain coating, multilayer curtain coating. Some of these methods allow for simultaneous coatings of more than one layer, which is preferred from a manufacturing economic perspective if more than one layer or type of layer needs to be applied. Known coating and drying methods are described in further detail in *Research Disclosure* No. 308119, published December 1989, pages 1007–1008. After coating, the layers are generally dried by simple evaporation, which may be accelerated by known techniques such as convection heating.

The image recording layer coating composition may be applied to one or both substrate surfaces through conventional pre-metered or post-metered coating methods listed above. The choice of coating process would be determined from the economics of the operation and, in turn, would determine the formulation specifications such as coating solids, coating viscosity, and coating speed.

The voided layer may also contain white pigments which are known to improve the photographic responses such as whiteness or sharpness. Titanium dioxide may be used to improve image sharpness. The $TiO_2$ used may be either anatase or rutile type. Other pigments to improve photographic responses may also be used in this invention such as, barium sulfate, clay, calcium carbonate or silica.

Addenda may be added to the layers to change the color of the imaging element. For photographic use, a white base with a slight bluish tinge is preferred. The addition of the slight bluish tinge may be accomplished by any process which is known in the art including the machine blending of color concentrate prior to extrusion and the melt extrusion of blue colorants that have been pre-blended at the desired blend ratio.

One or more subbing layers may be present on top of the base for use in the invention, between the base and the image recording layer used with the invention. These layers may add functionality such as antistatic properties, control colorimetry, and improve image recording layer adhesion to the base.

These layers may be coated onto the microvoided layers after the coextrusion and orienting process or between casting and full orientation. Examples of this would be acrylic coatings for printability, coating polyvinylidene chloride for heat seal properties or barrier properties. Further examples include flame, plasma or corona discharge treatment to improve printability or adhesion. In addition it may also be possible to provide either an integral layer or a separately coated layer of either an electrical conductive or charge control layer to minimized the generation of electrostatic glow or discharge of a photosensitive imaging member. In the case of a charge control layer that is either integral to another functional layer or a functional layer by itself, the charge control agents may be substantially electrically neutral to the photosensitive emulsion or its protective overcoat.

In order to improve the adhesion of the imaging layer to the support, an under-coating or subbing layer may be applied to the surface of the support. This layer may be an adhesive layer such as, for example, halogenated phenols, partially hydrolyzed vinyl chloride-co-vinyl acetate polymer, vinylidene chloride-methyl acrylate-itaconic acid terpolymer, a vinylidene chloride-acrylonitrile-acrylic acid terpolymer, or a glycidyl (meth)acrylate polymer or copolymer. Other chemical adhesives, such as polymers, copolymers, reactive polymers or copolymers, that exhibit good bonding between the ink receiving layer and the support may be used. The polymeric binder in the subbing layer employed with the invention may be preferably a water soluble or water dispersible polymer such as poly(vinyl alcohol), poly(vinyl pyrrolidone), gelatin, a cellulose ether, a poly(oxazoline), a poly(vinylacetamide), partially hydrolyzed poly(vinyl acetate/vinyl alcohol), poly(acrylic acid), poly(acrylamide), poly(alkylene oxide), a sulfonated or phosphated polyester or polystyrene, casein, zein, albumin, chitin, chitosan, dextran, pectin, a collagen derivative, collodian, agar-agar, arrowroot, guar, carrageenan, tragacanth, xanthan, rhamsan, a latex such as poly(styrene-co-butadiene), a polyurethane latex, a polyester latex, or a poly(acrylate), poly(methacrylate), poly(acrylamide) or copolymers thereof.

Another preferred embodiment of this invention is an image recording element with a base comprising a voided layer as described above with a silver halide imaging layer adjacent to the voided layer. This imaging layer or layers may be on one or both sides of the voided layer. Alternatively a transparent polyester layer may be disposed between one or both surfaces of the voided layer and the silver halide imaging layers. Typical applications of this embodiment may be duplitized backlit display medias as described in U.S. Pat. Nos. 6,093,521 and 6,355,404.

Any of the above described embodiments of this invention could further be laminated to a substrate to further increase the utility of the imaging element. Typical substrates may be fabrics, paper, polymer sheets.

If desired, the microvoided layer may be disposed on a substrate such as a paper substrate. The substrate may be either transparent or opaque. Opaque substrates include plain paper, coated paper, resin-coated paper such as polyolefin-coated paper, synthetic paper, photographic paper support, melt-extrusion-coated paper, and polyolefin-laminated paper. Biaxially oriented substrates include a paper base and a biaxially oriented polyolefin sheet, typically polypropylene, laminated to one or both sides of the paper base. The substrate may also consist of microporous materials such as polyethylene polymer-containing material sold by PPG Industries, Inc., Pittsburgh, Pennsylvania under the trade name of Teslin®, Tyvek® synthetic paper (DuPont Corp.), impregnated paper such as Duraform®, and OPPalyte® films (Mobil Chemical Co.) and other composite films listed in U.S. Pat. No. 5,244,861. Transparent substrates include glass, cellulose derivatives, such as a cellulose ester, cellulose triacetate, cellulose diacetate, cellulose acetate propionate, cellulose acetate butyrate, polyesters, such as poly(ethylene terephthalate), poly(ethylene naphthalate), poly-1,4-cyclohexanedimethylene terephthalate, poly (butylene terephthalate), and copolymers thereof, polyimides, polyamides, polycarbonates, polystyrene, polyolefins, such as polyethylene or polypropylene, polysulfones, polyacrylates, polyether imides, and mixtures thereof. The papers listed above include a broad range of papers, from high end papers, such as photographic paper to low end papers, such as newsprint. In a preferred embodiment, Ektacolor paper made by Eastman Kodak Co. may be employed.

Used herein, the phrase "imaging element" comprises an imaging support as described above along with an image receiving or recording layer, such as a support for photographic silver halide images. As used herein, the phrase "photographic element" is a material that utilizes photosensitive silver halide in the formation of images.

In another embodiment, in order to produce photographic elements, the composite support sheet may be coated with a photographic element or elements. The photographic elements may be single color elements or multicolor elements. Multicolor elements contain image ink or dye-forming units sensitive to each of the three primary regions of the spectrum. Each unit may comprise a single emulsion layer or multiple emulsion layers sensitive to a given region of the spectrum. The layers of the element, including the layers of the image-forming units, may be arranged in various orders as known in the art. In an alternative format, the emulsions sensitive to each of the three primary regions of the spectrum may be disposed as a single segmented layer.

The photographic emulsions useful for this invention may be generally prepared by precipitating silver halide crystals in a colloidal matrix by methods conventional in the art. The colloid may be typically a hydrophilic film forming agent such as gelatin, alginic acid, or derivatives thereof.

The crystals formed in the precipitation step may be washed and then chemically and spectrally sensitized by adding spectral sensitizing dyes and chemical sensitizers, and by providing a heating step during which the emulsion temperature may be raised, typically from 40° C. to 70 ° C., and maintained for a period of time. The precipitation and spectral and chemical sensitization methods utilized in preparing the emulsions employed in the invention may be those methods known in the art.

Chemical sensitization of the emulsion typically employs sensitizers such as: sulfur-containing compounds, for example, allyl isothiocyanate, sodium thiosulfate and allyl thiourea, reducing agents, for example, polyamines and stannous salts, noble metal compounds, for example, gold, platinum, and polymeric agents, for example, polyalkylene oxides. As described, heat treatment may be employed to complete chemical sensitization. Spectral sensitization may be effected with a combination of dyes, which are designed for the wavelength range of interest within the visible or infrared spectrum. It is known to add such dyes both before and after heat treatment.

After spectral sensitization, the emulsion may be coated on a support. Various coating techniques include dip coating, air knife coating, curtain coating and extrusion coating.

The silver halide emulsions utilized in this invention may be comprised of any halide distribution. Thus, they may be comprised of silver chloride, silver bromide, silver bromochloride, silver chlorobromide, silver iodochloride, silver iodobromide, silver bromoiodochloride, silver chloroiodobromide, silver iodobromochloride, and silver iodochlorobromide emulsions. By predominantly silver chloride, it is meant that the grains of the emulsion are greater than 50 mole percent silver chloride. Preferably, they are greater than 90 mole percent silver chloride, and optimally greater than 95 mole percent silver chloride.

The silver halide emulsions may contain grains of any size and morphology. Thus, the grains may take the form of cubes, octahedrons, cubo-octahedrons, or any of the other naturally occurring morphologies of cubic lattice type silver halide grains. Further, the grains may be irregular such as spherical grains or tabular or core/shell grains. Grains having a tabular or cubic morphology are preferred.

The photographic elements of the invention may utilize emulsions as described in The Theory of the Photographic Process, Fourth Edition, T. H. James, Macmillan Publishing Company, Inc., 1977, pages 151–152. Reduction sensitization has been known to improve the photographic sensitivity of silver halide emulsions. While reduction sensitized silver halide emulsions generally exhibit good photographic speed, they often suffer from undesirable fog and poor storage stability.

Reduction sensitization may be performed intentionally by adding reduction sensitizers, chemicals that reduce silver ions to form metallic silver atoms, or by providing a reducing environment such as high pH (excess hydroxide ion) and/or low pAg (excess silver ion). During precipitation of a silver halide emulsion, unintentional reduction sensitization may occur when, for example, silver nitrate or alkali solutions may be added rapidly or with poor mixing to form emulsion grains. Also, precipitation of silver halide emulsions in the presence of ripeners (grain growth modifiers) such as thioethers, selenoethers, thioureas, or ammonia tends to facilitate reduction sensitization.

Examples of reduction sensitizers and environments which may be used during precipitation or spectral/chemical sensitization to reduction sensitize an emulsion include ascorbic acid derivatives, tin compounds, polyamine compounds, and thiourea dioxide-based compounds described in U.S. Pat. Nos. 2,487,850; 2,512,925; and British Patent 789,823. Specific examples of reduction sensitizers or conditions, such as dimethylamineborane, stannous chloride, hydrazine, high pH (pH 8–11) and low pAg (pAg 1–7) ripening are discussed by S. Collier in Photographic Science and Engineering, 23, 113 (1979). Examples of processes for preparing intentionally reduction sensitized silver halide emulsions are described in EP 0 348 934 A1 (Yamashita), EP 0 369 491 (Yamashita), EP 0 371 388 (Ohashi), EP 0 396 424 A1 (Takada), EP 0 404 142 A1 (Yamada), and EP 0 435 355 A1 (Makino).

The photographic elements of this invention may use emulsions doped with Group VII metals such as iridium, rhodium, osmium, and iron as described in *Research Disclosure*, September 1994, Item 36544, Section I, published by Kenneth Mason Publications, Ltd., Dudley Annex, 12a North Street, Emsworth, Hampshire PO10 7DQ, ENGLAND. Additionally, a general summary of the use of iridium in the sensitization of silver halide emulsions is contained in Carroll, "Iridium Sensitization: A Literature Review," Photographic Science and Engineering, Vol. 24, No. 6, 1980. A method of manufacturing a silver halide emulsion by chemically sensitizing the emulsion in the presence of an iridium salt and a photographic spectral sensitizing dye is described in U.S. Pat. No. 4,693,965. In some cases, when such dopants are incorporated, emulsions show an increased fresh fog and a lower contrast sensitometric curve when processed in the color reversal E-6 process as described in The British Journal of Photography Annual, 1982, pages 201–203.

A typical multicolor photographic element comprises the invention aminated support bearing a cyan ink or dye image-forming unit comprising at least one red-sensitive silver halide emulsion layer having associated therewith at least one cyan dye-forming coupler, a magenta image-forming unit comprising at least one green-sensitive silver halide emulsion layer having associated therewith at least one magenta dye-forming coupler, and a yellow dye image-forming unit comprising at least one blue-sensitive silver halide emulsion layer having associated therewith at least one yellow dye-forming coupler. The element may contain additional layers, such as filter layers, interlayers, overcoat layers, and subbing layers. The support or base useful with the invention may also be utilized for black and white photographic print elements.

The photographic elements may also contain a transparent magnetic recording layer such as a layer containing magnetic particles on the underside of a transparent support, as in U.S. Pat. Nos. 4,279,945 and 4,302,523. The invention may be utilized with the materials disclosed in Research Disclosure, September 1997, Item 40145. The invention may be particularly suitable for use with the material color paper examples of sections XVI and XVII. The couplers of section II may also be particularly suitable. The Magenta I couplers of section II, particularly M-7, M-10, M-18, and M-18, set forth below may be particularly desirable. In the following Table, reference will be made to (1) *Research Disclosure*, December 1978, Item 17643, (2) *Research Disclosure*, December 1989, Item 308119, and (3) *Research Disclosure*, September 1994, Item 36544, all published by Kenneth Mason Publications, Ltd., Dudley Annex, 12a North Street, Emsworth, Hampshire PO10 7DQ, ENGLAND. Table 1 and the references cited in Table 1 are to be read as describing particular components suitable for use in the elements of the invention. The Table and its cited references also describe suitable ways of preparing, exposing, processing and manipulating the elements and the images contained therein.

TABLE 1

| Reference | Section | Subject Matter |
|---|---|---|
| 1 | I, II | Grain composition, |
| 2 | I, II, IX, X, XI, XII, XIV, XV | morphology and preparation. Emulsion preparation including |
|  | I, II, III, IX | hardeners, coating aids, |
| 3 | A & B | addenda, etc. |
| 1 | III, IV | Chemical sensitization and |
| 2 | III, IV | spectral sensitization |
| 3 | IV, V | Desensitization. |
| 1 | V | UV dyes, optical brighteners, |

TABLE 1-continued

| Reference | Section | Subject Matter |
|---|---|---|
| 2 | V | luminescent dyes |
| 3 | VI | |
| 1 | VII | Antifoggants and stabilizers |
| 2 | VI | |
| 3 | VII | |
| 1 | VIII | Absorbing and scattering |
| 2 | VIII, XIII, XVI | materials; Antistatic layers; |
| 3 | VIII, IX C & D | matting agents |
| 1 | VII | Image-couplers and image- |
| 2 | VII | modifying couplers; Dye |
| 3 | X | stabilizers and hue modifiers |
| 1 | XVII | Supports |
| 2 | XVII | |
| 3 | XV | |
| 3 | XI | Specific layer arrangements |
| 3 | XII, XIII | Negative working emulsions; Direct positive emulsions |
| 2 | XVIII | Exposure |
| 3 | XVI | |
| 1 | XIX, XX | Chemical processing; |
| 2 | XIX, XX, XXII | Developing agents |
| 3 | XVIII, XIX, XX | |
| 3 | XIV | Scanning and digital processing procedures |

The photographic elements may be exposed with various forms of energy which encompass the ultraviolet, visible, and infrared regions of the electromagnetic spectrum as well as with electron beam, beta radiation, gamma radiation, x-ray, alpha particle, neutron radiation, and other forms of corpuscular and wave-like radiant energy in either noncoherent (random phase) forms or coherent (in phase) forms, as produced by lasers. When the photographic elements are intended to be exposed by x-rays, they may include features found in conventional radiographic elements.

The photographic elements may be preferably exposed to actinic radiation, typically in the visible region of the spectrum, to form a latent image, and then processed to form a visible image, preferably by other than heat treatment. Processing may be preferably carried out in the known RA-4.TM. (Eastman Kodak Company) Process or other processing systems suitable for developing high chloride emulsions. In one embodiment, this invention may be directed towards a photographic recording element comprising a support and at least one light sensitive silver halide emulsion layer comprising silver halide grains as described above.

For the image recording element of this invention utilized as a display material, at least one image layer containing silver halide and a dye forming coupler located on the top side or bottom side of the imaging element may be preferred. Applying the imaging layer to either the top or bottom may be preferred for a quality photographic transmission display material. For some markets improved image quality requires an increase in dye density. Increasing dye density increases the amount of light sensitive silver halide emulsion coated on one side. While the increase in emulsion coverage does improve image quality, developer time may be increased from 50 seconds to 110 seconds. For the image recording element of this invention, when used as a display material, it is preferred that at least one image layer comprising at least one dye forming coupler is located on both the top and bottom of the imaging support used with this invention is preferred. Applying an image layer to both the top and bottom of the support allows for optimization of image density with thinner photosensitive layers while allowing for developer time less than 50 seconds.

The image recording element, when used as a display material, wherein at least one dye forming layer on the top side comprises about the same amount of dye forming coupler of the imaging layer on the backside is most preferred. Coating substantially the same amount of light sensitive silver halide emulsion on both sides has the additional benefit of balancing the imaging element for image curl caused by the contraction and expansion of the hydroscopic gel typically utilized in photographic emulsions.

The following examples are provided to illustrate the invention. They are not intended to be exhaustive of all possible variations of the invention. Parts and percentages are by weight unless otherwise indicated.

EXAMPLES

The following is an illustrative example of a possible procedure for preparing the crosslinked organic microbeads coated with slip agent. In this example, the polymer is polymethyl(methacrylate) crosslinked with divinylbenzene. The crosslinked organic microbeads have a coating of silica. The crosslinked organic microbeads may be prepared by a procedure in which monomer droplets containing an initiator may be sized and heated to give solid polymer spheres of the same size as the monomer droplets. A water phase is prepared by combining 7 liters of distilled water, 1.5 g potassium dichromate (polymerization inhibitor for the aqueous phase), 250 g polymethylaminoethanol adipate (promoter), and 350 g LUDOX® (a colloidal suspension containing 50% silica sold by DuPont). A monomer phase is prepared by combining 3317 g methyl(methacrylate), 1421 g divinylbenzene (55% active cross-linking agent; other 45% is ethyl vinyl benzene which forms part of the methyl (methacrylate) polymer chain) and 45 g VAZO® 52 (a monomer-soluble initiator sold by DuPont). The mixture is passed through a homogenizer to obtain 1.7 $\mu$m droplets. The suspension is heated overnight at 52° C. to give 4.3 kg of generally spherical crosslinked organic microbeads having an average diameter of about 5 $\mu$m with narrow size distribution (about 1–3 $\mu$m size distribution). The mol proportion of styrene and ethyl vinyl benzene to divinylbenzene is about 6.1 %. The concentration of divinylbenzene may be adjusted up or down to result in about 2.5–50% (preferably 10–40%) cross-linking by the active cross-linker.

The following examples demonstrate the improvement of the invention when used as a duplitized silver halide backlit display imaging element.

Example 1

Voided Layer Made with Crosslinked Microbeads Only (Comparative)

A two layer co-extruded film comprising a voided polyester matrix layer and a transparent polyester layer was prepared in the following manner. The materials used in the preparation of the voided layer were a compounded blend consisting of 35% by weight PETG 6763 resin (IV=0.73 dl/g) (an amorphous polyester resin available from Eastman Chemical Company), 35% by weight polyethylene terephthalate (PET #7352 from Eastman Chemicals), and 30% by weight crosslinked spherical poly(methyl methacrylate), (PMMA), beads 1.7 $\mu$m in diameter. The crosslinked organic beads were prepared by the limited coalescence method described heretofore. The beaded poly(methyl methacrylate) was compounded with the polyester resins through mixing in a counter-rotating twin screw extruder attached to a pelletizing die forming pellets of the resin mixture. The material used in the preparation of the transparent polyester layer was polyethylene terephthalate (PET #7352 from Eastman Chemicals) in pellet form.

The above described resins were dried at a temperature of 65° C. for the PMMA filled resin and 150° C. for the transparent PET resin. The resins were then melted at 275° C. and fed by plasticating screw extruders into a multi-manifold co-extrusion die to produce melt streams which were brought together in a laminated film structure and rapidly quenched on a chill roll after issuing from the die. By regulating the throughput of the extruders, it was possible to adjust the thickness of each layer individually in the resulting cast sheet. In this case the thickness of the PMMA filled layer was 200 µm and the thickness of the transparent polyester layer was 1400 µm. The cast sheet was first oriented in the machine direction by stretching at a ratio of 3.3 and a temperature of 110° C. This sheet was then oriented in the transverse direction in a tenter frame at a ratio of 3.3 and a temperature of 100° C. without tearing. The stretched sheet was then heat set at 210C. The spectral transmission of the film was then measured using the measurement technique described heretofore.

Example 2

Voided Layer Made with Non-crosslinked Polymer Particles That Are Immiscible with the Polyester Matrix Only (Comparative)

A two layer co-extruded film comprising a voided polyester layer and a transparent polyester layer was prepared in the following manner. The materials of the voided layer were prepared polyethylene terephthalate (PET #7352 from Eastman Chemicals) dry blended with Polypropylene ("PP", Huntsman P4G2Z-073AX) at 20% weight based on the total weight of the blend. The material used in the preparation of the transparent polyester layer was polyethylene terephthalate (PET #7352 from Eastman Chemicals) in pellet form.

The above described resins were dried at a temperature of 65°C. for the PET/PP blended resin and 150° C. for the transparent PET resin. The resins were then melted at 275° C. and fed by plasticating screw extruders into a multi-manifold co-extrusion die to produce melt streams which were brought together in a laminated film structure and rapidly quenched on a chill roll after issuing from the die. By regulating the throughput of the extruders, it was possible to adjust the thickness of each layer individually in the resulting cast sheet. In this case the thickness of the PMMA filled layer was 200 µm and the thickness of the transparent polyester layer was 1400 µm. The cast sheet was first oriented in the machine direction by stretching at a ratio of 3.3 and a temperature of 110° C. This sheet was then oriented in the transverse direction in a tenter frame at a ratio of 3.3 and a temperature of 100° C. without tearing. The stretched sheet was then heat set at 150° C. The spectral transmission of the film was then measured using the measurement technique described heretofore.

Example 3 (Invention)

A two layer co-extruded film comprising a voided polyester layer and a transparent polyester layer was prepared in the following manner. The material used in the preparation of the voided layer was a 1:1 blend of the PMMA filled resin described in example 1 and the PET/PP blended resin described in example 2. The material used in the preparation of the transparent polyester layer was polyethylene terephthalate (PET #7352 from Eastman Chemicals) in pellet form.

The above described resins were dried at a temperature of 65° C. for the blended resin and 150° C. for the transparent PET resin. The resins were then melted at 275° C. and fed by plasticating screw extruders into a multi-manifold co-extrusion die to produce melt streams which were brought together in a laminated film structure and rapidly quenched on a chill roll after issuing from the die. By regulating the throughput of the extruders, it was possible to adjust the thickness of each layer individually in the resulting cast sheet. In this case the thickness of the filled layer was 200 µm and the thickness of the transparent polyester layer was 1400 µm. The cast sheet was first oriented in the machine direction by stretching at a ratio of 3.3 and a temperature of 110° C. This sheet was then oriented in the transverse direction in a tenter frame at a ratio of 3.3 and a temperature of 100° C. without tearing. The stretched sheet was then heat set at 150° C. The spectral transmission of the film was then measured using the measurement technique described heretofore.

The imaging medias of Examples 1-3 were coated on both sides with silver halide imaging layers as described in Example 2–4 of U.S. Pat. No. 6,355,404. They were then imaged using the known RA-4™ (Eastman Kodak Company) process. A visual rating of the image sharpness was then performed for each imaged element produced from Examples 1–3. Table 1 summarizes Examples 1 through 3 and includes a measurement of total thickness, spectral transmission, as well as a relative ranking of material cost to produce each element. The material cost is significantly affected the voided layer material as discussed heretofore.

TABLE 1

| SAMPLE | VOIDE LAYER DESCRIPTION | THICKNESS (um's) | TRANSMISSION (%) | PRINTED SHARPNESS | RELATIVE COST |
|---|---|---|---|---|---|
| Example 1 (Comparative) | 30% PMMA in Polyester | 171 | 52 | GOOD | HIGH |
| Example 2 (Comparative) | 20% PP in Polyester | 175 | 55 | POOR | LOW |
| Example 3 (Invention) | 1:1 blend Ex. 1 & 2 | 173 | 53 | GOOD | MODERATE |

Table 1 illustrates the ability of the present invention to maintain equivalency with conventional imaging media utilizing either microbeads or immiscible polymer particles with respect to important imaging properties, such as thickness and transmissiveness, while producing a less costly media with the same sharpness quality, unimpeded by the addition of material that would be expected to degrade the sharpness quality. It may be seen from Table 1 that the PMMA voided material of example 1 offers good image sharpness but at a high cost of materials and more complicated manufacturing. The PP voided material of example 2 offers low cost of material but results in poor image sharpness which renders the display element of little commercial value. A combination of the two would be expected to produce a lower cost material with sharpness quality between good and poor. However, the blended voided layer of example 3 (invention) offers image sharpness equivalent to the use of the expensive microbeads alone and a lower moderate cost of materials and manufacturing versus the PMMA voided material of example 1.

What is claimed is:

1. An image recording element comprising a microvoided layer comprising a continuous phase polyester matrix having dispersed therein crosslinked organic microbeads and non-crosslinked polymer particles that are immiscible with the polyester matrix of said microvoided layer.

2. The element of claim 1 wherein the microvoided layer has a void volume of at least 25% by volume.

3. The element of claim 1 wherein said continuous phase polyester of said microvoided layer comprises polyethylene (terephthalate) or a copolymer thereof.

4. The element of claim 1 wherein said continuous phase polyester of said microvoided layer comprises a blend comprising polyethylene(terephthalate) and poly(1,4-cyclohexylene dimethylene terephthalate).

5. The element of claim 1 wherein said crosslinked organic microbeads comprise at least one of styrene, butyl acrylate, acrylamide, acrylonitrile, methyl methacrylate, ethylene glycol dimethacrylate, vinyl pyridine, vinyl acetate, methyl acrylate, vinylbenzyl chloride, vinylidene chloride, acrylic acid, divinylbenzene, arylamidomethyl-propane sulfonic acid, vinyl toluene, trimethylol propane triacrylate.

6. The element of claim 1 wherein said crosslinked organic microbead comprise a poly(methyl methacrylate) or poly(butyl acrylate) polymer.

7. The element of claim 1 wherein said immiscible polymeric particles have an olefinic backbone.

8. The element of claim 7 wherein said immiscible polymeric particles comprise polymers derived from a monomer selected from propylene or ethylene.

9. The element of claim 7 wherein said polyolefin comprises polypropylene.

10. The element of claim 1 wherein said microvoided layer has a density of less than 0.95 grams/cc.

11. The element of claim 1 wherein said microvoided layer has a density of from 0.4 to 0.90 grams/cc.

12. The element of claim 1 wherein the total thickness of said microvoided layer is from 100 to 400 micrometers.

13. The element of claim 1 wherein the total thickness of said microvoided layer is from 150 to 300 micrometers.

14. The element of claim 1 wherein the total thickness of said microvoided layer is from 170 to 200 micrometers.

15. The element of claim 1 further comprising an image recording layer disposed on at least 1 surface of said microvoided layer, wherein said microvoided layer comprises a base for said element.

16. The element of claim 15 wherein said image recording layer comprises a silver halide imaging layer.

17. The element of claim 15 further comprising one or more subbing layers are present between said image recording layer and said base.

18. The element of claim 1 wherein said element is laminated to a substrate.

19. The element of claim 18 wherein said substrate comprises fabric.

20. The element of claim 18 wherein said substrate comprises paper.

21. The element of claim 18 wherein said substrate comprises a polymer sheet.

22. The element of claim 18 wherein said polymer sheet is voided.

23. The element of claim 18 wherein said polymer sheet is oriented.

24. The element of claim 1 wherein the ratio of the volume of crosslinked organic microbeads to the volume of immiscible polymeric particles is from 3:2 to 2:3.

25. The element of claim 1 wherein the ratio of the volume of crosslinked organic microbeads to the volume of immiscible polymeric particles is 1:1.

* * * * *